United States Patent [19]

Mochida et al.

[11] Patent Number: 4,595,662
[45] Date of Patent: Jun. 17, 1986

[54] CERAMIC MATERIAL FOR A HONEYCOMB STRUCTURE

[75] Inventors: Shigeru Mochida, Kasugai; Shunichi Yamada, Nagoya; Toshiyuki Hamanaka, Suzuka, all of Japan

[73] Assignee: NGK Insulators, Ltd., Japan

[21] Appl. No.: 686,397

[22] Filed: Dec. 26, 1984

[30] Foreign Application Priority Data

Dec. 28, 1983 [JP] Japan .................. 58-249787

[51] Int. Cl.$^4$ .......... C03C 8/24; C04B 35/18
[52] U.S. Cl. .................. 501/15; 501/7; 501/17; 501/32; 501/89; 501/119; 501/120
[58] Field of Search .......... 501/7, 9, 153, 119–121, 501/15, 17, 32, 89

[56] References Cited

U.S. PATENT DOCUMENTS

| | | | |
|---|---|---|---|
| 3,473,999 | 10/1969 | Muchow | 501/15 X |
| 4,057,434 | 1/1977 | Rittler | 501/7 |
| 4,304,585 | 12/1981 | Matsuhisa et al. | |
| 4,357,987 | 11/1982 | Matsuhisa et al. | |
| 4,526,876 | 7/1985 | Hodge | 501/153 X |

FOREIGN PATENT DOCUMENTS 0698665 11/1964 Canada ................. 501/17

OTHER PUBLICATIONS

Copy of Official Gazette, Feb. 6, 1973 of U.S. Pat. No. 3,715,196.
Copy of Official Gazette, Jan. 11, 1972 of U.S. Pat. No. 3,634,111.

Primary Examiner—William R. Dixon, Jr.
Assistant Examiner—Karl Group
Attorney, Agent, or Firm—Parkhurst & Oliff

[57] ABSTRACT

A ceramic material for a honeycomb structure is prepared from a mixture of raw materials comprising per 100 parts by weight of the mixture 40 to 90 parts by weight of cordierite powder and 10 to 60 parts by weight of crystalline glass powder having a crystalline phase consisting mainly of a solid solution of $\beta$-spodumene. The mixture consists essentially of 51.5 to 64.4% by weight of $SiO_2$, 24.8 to 33.7% by weight of $Al_2O_3$, 5.5 to 12.4% by weight of MgO and 0.4 to 2.7% by weight of $Li_2O$. It may further contain up to 5.1% by weight of $TiO_2$ and up to 1.8% by weight of $ZrO_2$.

7 Claims, 3 Drawing Figures

CERAMIC MATERIAL FOR A HONEYCOMB STRUCTURE

BACKGROUND OF THE INVENTION

1. Field of the Invention

This invention relates to a ceramic material or composition for making a honeycomb structure, such as a device for purifying the exhaust gas of an automobile, a filter for collecting fine particles from the exhaust gas of a diesel engine or a rotary regenerator type ceramic heat exchanger. More particularly, it relates to a ceramic composition which consists mainly of cordierite and LAS (lithium aluminum silicate), and which is useful for joining or bonding two or more ceramic structures of honeycomb construction together or a ceramic structure of honeycomb construction to another ceramic structure of different construction, or for covering or impregnating a ceramic structure of honeycomb construction to improve its strength and gas tightness.

2. Description of the Prior Art

There is known a ceramic structure of honeycomb construction which is widely used as, for example, a support, a filter or a heat exchanger. There is, for example, known a rotary regenerator type ceramic heat exchanger which comprises a cylindrical matrix of the honeycomb construction having a diameter of 30 cm to 2 m, and a matrix-holding ring fitting on the outer peripheral edge of the cylindrical matrix. This heat exchanger is divided into two halves by longitudinally extending means defining a heating fluid passage on one side thereof and a heat recovering fluid passage on the other side thereof. One of the halves is heated by a hot fluid and stores or absorbs heat, while the other half releases or transfers heat to a fluid to be heated. As the heat exchanger is rotated, each half thereof is alternately heated and cooled to perform heat exchange.

The rotary regenerator type ceramic heat exchanger as hereinabove described is required to have a high heat exchange efficiency, permit a fluid to flow therethrough smoothly without a substantial drop in pressure, and have a sufficiently high degree of thermal stress resistance to withstand a large temperature gradient. It is also important that the matrix is sufficently leakproof to maintain a high heat exchange efficiency and thereby a high operating efficiency of the system in which the heat exchanger is employed.

A large rotary regenerator type ceramic heat exchanger has hitherto been produced by a method which is disclosed, for example, in U.S. Pat. Nos. 4,303,585 and 4,357,987 which correspond to Japanese Laid-Open Patent Publication No. 46338/1980. According to this method, a plurality of molded segments for a honeycomb matrix are fired and bonded together by a ceramic binding material having substantially the same mineral composition as the matrix segments and differing therefrom only to a very small extent in coefficient of thermal expansion, and the bonded segments are fired. When the bonded segments are fired, however, the degree of thermal contraction of the binder differs from the degree of thermal expansion of the matrix segments. This difference brings about a reduction in the bonding strength of the joint and, as a result, their destruction due to thermal stress. This is particularly a big problem to a centrally supported rotary regenerator type ceramic heat exchanger. It has in its center a ceramic hub having an axial bore in which a rotary supporting shaft is fitted. The hub remains relatively cool, since it is not exposed to a hot fluid, but held in contact with the supporting shaft made of a metal and having good thermal conductivity, while the matrix segments are exposed to the hot fluid. Therefore, the joint between the hub and the matrix segments is not satisfactory in bonding strength.

U.S. Pat. No. 3,634,111, which corresponds to Japanese Patent Publication No. 14838/1972, proposes the use of a foamable lithium aluminum silicate (LAS) cement as a binder for a ceramic heat exchanger. U.S. Pat. No. 3,715,196, which corresponds to Japanese Laid-Open Patent Publication No. 5835/1972, proposes the use of a mixture of thermally devitrifiable glass and a fibrous flux which can be heat-treated to form crystalline glass. These binders, however, also have a number of drawbacks. The former binder is not satisfactory in chemical stability to acids and sodium. Moreover, its softening temperature not exceeding 1300° C. limits the scope of its application. The latter is unsatisfactory in heat resistance and thermal expansion characteristics and, therefore, has only a limited scope of application.

Various methods have been proposed for reducing the leakage of a fluid from a rotary regenerator type ceramic heat exchanger. The leakage can be reduced if the leakage of a fluid through the pores of a partition in a honeycomb matrix or through the layers joining the matrix segments is reduced. If the heat exchanger is in the shape of a ring, the leakage can be reduced by the provision of a leakproofing coating layer on each of its inner and outer peripheries. The use of a highly gastight ceramic binding material enables the layers joining the segments to reduce the fluid leakage. A drastic reduction in leakage can be expected if a highly gastight coating is applied to the outer periphery of the heat exchanger, or if the pores of the partition in the matrix are sealed by a highly gastight material.

The matrix of a honeycomb structure is, however, usually formed of a material having a low coefficient of thermal expansion, such as LAS, cordierite or aluminum titanate. The joining of the matrix segments, the coating of the outer periphery of the matrix and the sealing of the pores of its partition must, therefore, be performed by a material having a low coefficient of thermal expansion which differs only to a small extent from that of the matrix material. No such material has hitherto been discovered.

The use of a low thermal expansion type composite material composed of cordierite and LAS has been extensively studied, but has not yet given any satisfactory result. On the contrary, it has hitherto not been considered applicable to a heat exchanger, since its coefficient of thermal expansion is increased by the formation of a crystalline phase, such as of mullite, spinel or corundum, when it is fired.

SUMMARY OF THE INVENTION

Under these circumstances, it is an object of this invention to provide a ceramic material which comprises cordierite and LAS, and which is particularly suitable for fabricating a ceramic structure of honeycomb construction, such as a rotary regenerator type ceramic heat exchanger, making it leakproof and reinforcing it.

It is another object of this invention to provide a material which has a low coefficient of thermal expansion and excellent in heat resistance, mechanical strength, chemical stability and gas tightness, and which is suitable for fabricating a ceramic structure of the honeycomb construction, coating its outer periphery to improve its gas tightness or sealing the pores of a partition in the ceramic structure.

These objects are attained by a ceramic material for a honeycomb structure comprising, per 100 parts by weight of the material, 40 to 90 parts by weight of cordierite powder and 10 to 60 parts by weight of crystalline glass powder having a crystalline phase consisting mainly of a solid solution of $\beta$-spodumene, the ceramic material containing 51.5 to 64.4% by weight of $SiO_2$, 24.8 to 33.7% by weight of $Al_2O_3$, 0 to 5.1% by weight of $TiO_2$, 5.5 to 12.4% by weight of MgO, 0.4 to 2.7% by weight of $Li_2O$ and 0 to 1.8% by weight of $ZrO_2$.

The ceramic material or composition according to this invention is particularly useful for joining or bonding the segments of a rotary regenerator type ceramic heat exchanger, coating it and sealing the pores of a partition defining its honeycomb matrix. It makes it possible to manufacture a rotary regenerator type ceramic heat exchanger having a hub in its center, and which is excellent in the bonding strength of the joints between the segments, thermal stress resistance and leak proofness.

The applicability of the material according to this invention is, however, not limited to a rotary regenerator type ceramic heat exchanger. It is also useful for joining the honeycomb segments of a large ceramic filter of honeycomb construction, or for sealing the pores of a partition defining a honeycomb structure for a ceramic heat exchanger of alternating flow and heat transfer type. It is also widely applicable for coating the outer periphery of a ceramic structure of honeycomb construction to improve its leak proofness and strength.

The material of this invention can be used for joining, coating or sealing purposes in a customary fashion, for example, in the form of a paste or slurry prepared by adding an appropriate amount of an appropriate organic binder and/or water to the material.

The material of this invention has a low coefficient of thermal expansion and is excellent in heat resistance, mechanical strength, chemical stability and gas tightness. It is a material of very high industrial utility, as it is widely applicable to ceramic structures of honeycomb construction in general, including a rotary regenerator type ceramic heat exchanger which will hereinafter be taken up by way of example to describe the invention in further detail.

DETAILED DESCRIPTION OF THE INVENTION

Figure 1:
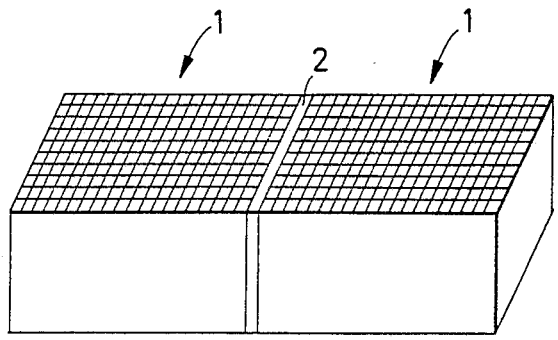
FIG. 1 is a perspective view of a pair of ceramic structures of honeycomb construction joined together by a material embodying this invention.

The material of this invention contains a crystalline phase which consists mainly of cordierite and a solid solution of $\beta$-spodumene. The material contains a small quantity of mullite, a solid solution of $\beta$-quartz and/or protoenstatite. It is preferable that the quantity of these crystals be as small as practically possible. Their total quantity should generally not exceed 10% by weight.

The material of this invention contains cordierite. It is preferable to employ cordierite of the type which is usually used to form a carrier for a catalyst for purifying the exhaust gas of an automobile. More specifically, it is desirable to use cordierite not containing a large amount of impurities, such as calcia, alkali, potassium or sodium, having a chemical composition in the vicinity of the theoretical chemical composition of cordierite $2MgO\cdot2Al_2O_3\cdot5SiO_2$ (51.3% $SiO_2$, 34.9% $Al_2O_3$ and 13.8% MgO, by weight) and containing at least 90% by weight of cordierite crystals. The use of cordierite powder containing a large amount of mullite or spinel crystals should be avoided, since they increase the thermal expansion of the material.

Another raw material used to prepare the material of this invention is crystalline glass powder having a crystalline phase consisting mainly of a solid solution of $\beta$-spodumene. It is obtained by: melting at a temperature of not lower than about 1600° C. a glass-forming batch composed of a LAS-forming material such as petalite, spodumene, lithium oxide or carbonate or silica, and a nucleus-forming material such as $TiO_2$, $ZrO_2$, or $GeO_2$, and sometimes further containing a clarifier such as $As_2O_3$; cooling the molten material to vitrify it; heat treating the vitrified material at a temperature of 1000° C. to 1200° C. to crystallize a solid solution of $\beta$-spodumene; and crushing the crystallized product. Therefore, the resulting crystalline glass has a crystalline phase consisting substantially of a solid solution of $\beta$-spodumene.

Glass having a crystalline phase composed of a solid solution of $\beta$-quartz is formed if the heat treatment of the vitrified material is performed under different conditions. The use of such glass and any other thermally devitrifiable glass is, however, undesirable, since it exerts an adverse effect on the dimensional stability of a ceramic material for a honeycomb structure and on its thermal expansion when it is aged at a high temperature. It has also been found that if a LAS-forming material, such as petalite, is substituted for the crystalline glass employed for the material of this invention, a great change occurs in the composition of the fired material when it is aged at a high temperature. It is, therefore, important to use crystalline glass powder containing a fully crystallized solid solution of $\beta$-spodumene.

The thermal expansion characteristics of crystalline glass containing a solid solution of $\beta$-spodumene are reflected in the ceramic material of this invention. If crystalline glass having a low coefficient of thermal expansion is used, the material of this invention has a correspondingly low coefficient of thermal expansion. It is, therefore, necessary to select crystalline glass having a composition having the desired thermal expansion characteristics of the ceramic material to be produced.

The powder of SiC or ZnO or a mixture thereof may be added as a flux to the raw materials for the material of this invention. The addition of the powder of SiC and/or ZnO is effective for lowering the firing temperature to some extent and improving the wetting property of the material of this invention relative to a ceramic structure of honeycomb construction to form a strong bond, without exerting any adverse effect on the thermal expansion characteristics of the material, its stability during aging at a high temperature and its chemical stability. There is no particular limitation to the crystal form of SiC powder or the method of its production if it is composed of fine particles and does not contain a large amount of impurities. As regards ZnO (zinc white), it is possible to use ZnO which is commercially available as a reagent, if it has a high purity and is composed of fine particles.

An appropriate organic binder, such as methyl cellulose, CMC or PVA, and/or water may be added to the material of this invention to form a paste or slurry thereof. The paste or slurry is applied to a ceramic structure of honeycomb construction, and the bonded assembly is fired. It is fired at a temperature of 1300° C. to 1450° C. A preferred firing temperature is in the range of 1350° C. to 1440° C. The firing temperature dictates the heat resistance of the material. The composition of the raw materials may be selected so as to manufacture a product having desired heat resistance. If the firing conditions, such as holding time, are changed, it is possible to employ different firing temperatures for different products which are manufactured from the raw materials of the same composition.

The material of this invention is most preferably applicable to a ceramic honeycomb structure formed of cordierite, in view of its thermal expansion level. The material of the invention is, however, also applicable to a honeycomb structure formed of, for example, mullite, alumina, LAS, aluminum titanate or silicate, or $MgO-Al_2O_3-TiO_2-Fe_2O_3-SiO_2$.

The proportions of the raw materials used for producing the material of this invention and the chemical composition thereof have certain limitations found necessary by the inventors of this invention as a result of their systematic and extensive experiments or tests. These limitations have been set for the reasons which will hereinafter be stated.

(1) Proportions of the Raw Materials

The material of this invention is formed of a mixture of cordierite powder and crystalline glass powder containing a solid solution of β-spodumene. If the mixture contains more than 90 parts by weight of cordierite and less than 10 parts by weight of crystalline glass per 100 parts by weight, the resulting material and a ceramic structure of honeycomb construction to which it is applied have a low bonding strength therebetween. If the mixture contains less than 40 parts by weight of cordierite and more than 60 parts by weight of crystalline glass powder, the reaction between the material and the ceramic structure of honeycomb construction is promoted and brings about a number of problems, such as its melting. According to this invention, therefore, it is necessary to employ 40 to 90 parts by weight of cordierite powder and 10 to 60 parts by weight of crystalline glass per 100 parts by weight of the raw materials.

(2) Chemical Composition

In addition to the limitations on the proportions of the raw materials, this invention has certain limitations on the chemical composition of the mixture of the raw materials as wil hereinafter be set forth.

If the raw materials contain less than 51.5% by weight of $SiO_2$, more than 33.7% by weight of $Al_2O_3$, or more than 12.4% by weight of MgO, the resulting material has a low bonding strength relative to a ceramic structure of honeycomb construction. If the raw materials contain more than 64.4% by weight of $SiO_2$, less than 24.8% by weight of $Al_2O_3$, or less than 5.5% by weight of MgO, there occurs a radical reaction between the resulting material and the ceramic structure of honeycomb construction to which it is applied. According to this invention, therefore, it is necessary to control the quantity of $SiO_2$ in the range of 51.5 to 64.4% by weight, $Al_2O_3$ in the range of 24.8 to 33.7% by weight and MgO in the range of 5.5 to 12.4% by weight.

If the raw materials contain less than 0.4% by weight of $Li_2O$, the resulting material fails to show a satisfactory bonding strength relative to a ceramic structure of honeycomb construction. If the raw materials contain more than 2.7% by weight of $Li_2O$, its reaction with cordierite powder proceeds to promote the crystallization of mullite, etc. and the reaction between the material and the ceramic structure of honeycomb construction proceeds to bring about a number of problems, such as its melting. Therefore, it is necessary to control the quantity of $Li_2O$ within the range of 0.4 to 2.7% by weight. Moreover, any excessive increase of $Li_2O$ should be avoided, since it brings about a reduction in the chemical stability of the material against acids and sodium.

The presence of more than 5.1% by weight of $TiO_2$ or more than 1.8% by weight of $ZrO_2$ in the raw materials gives rise to a reduction in the viscosity of the material during sintering, resulting in the failure to bond the ceramic structure of honeycomb construction satisfactorily, and also brings about other problems, such as an increase in its coefficient of thermal expansion. Therefore, it is necessary to control $TiO_2$ within 5.1% by weight and $ZrO_2$ within 1.8% by weight. Moreover, the raw materials do not necessarily need to contain $TiO_2$ or $ZrO_2$.

(3) SiC and ZnO

The raw materials may further contain SiC and/or ZnO for the reasons hereinbefore set forth. The quantity of SiC or ZnO which can be added has its own limitation. The addition of more than 5 parts by weight of SiC per 100 parts by weight of the mixture of the raw materials results in a reaction between the material and a ceramic structure of the honeycomb construction, which causes its melting, and also brings about other problems, such as an extreme increase in its thermal expansion. The addition of more than 3 parts by weight of ZnO per 100 parts by weight of the raw materials brings about a number of problems including its reaction with cordierite powder which promotes the crystallization of mullite, etc., and a reduction in the viscosity of the material during sintering, resulting in the failure to provide a satisfactory bond.

Therefore, if SiC or ZnO is added to the mixture of the raw materials, SiC must be added in a quantity not exceeding 5 parts by weight, and ZnO in a quantity not exceeding 3 parts by weight.

The invention will now be described more specifically with reference to several examples thereof which are, of course, not intended for limiting the scope of this invention. In the examples, percentage and parts will be shown by weight unless otherwise stated.

TABLE 1 shows the chemical composition of the cordierite powder and crystalline glass powder containing a solid solution of β-spodumene which were employed in the following examples.

TABLE 1

|  | Particle size (μm) | Crystalline Phase | Chemical compsoition (%) |  |  |  |  |  |
|---|---|---|---|---|---|---|---|---|
|  |  |  | $SiO_2$ | $Al_2O_3$ | $TiO_2$ | MgO | $Li_2O$ | $ZrO_2$ |
| Cordierite powder (A) | −44 | Cordierite | 50.0 | 35.0 | 0.5 | 13.5 | 0.0 | 0.0 |
| Cordierite powder (B) | −74 | Cordierite | 50.3 | 35.0 | 0.0 | 13.9 | 0.0 | 0.0 |
| Crystalline glass powder of solid solution of β-spodumene (A) | −74 | Solid solution of β-spodumene | 65.0 | 22.0 | 2.0 | 0.5 | 4.5 | 2.5 |

EXAMPLE 1

A variety of ceramic binding materials or binders for joining the segments of a cordierite honeycomb structure were prepared by mixing cordierite powder (A) and crystalline glass powder (A) which are shown in TABLE 1, a commercially available SiC powder having a particle size of −74 μm and zinc oxide (reagent grade) and adding methyl cellulose and water to each mixture to form a paste thereof. The proportions of the materials are shown in TABLE 2, and the chemical composition of each mixture in TABLE 3.

The segments to be joined were prepared by extrusion molding a known cordierite composition into a honeycomb body provided with square cells and having a partition thickness of 0.15 mm, and firing it at a maximum temperature of 1400° C. for six hours. The segments were 70 mm square by 50 mm high, and had a thermal expansion coefficient of 0.057% at 800° C.

Two segments were joined together by the paste of each binding material, as shown in FIG. 1, after the mutually facing end surfaces thereof had been appropriately machined or finished. The paste formed a joint layer 2 having a thickness of about 3 mm between the segments 1. The bonded assembly of the segments was fully dried at 100° C. and placed in an electric furnace for firing. This firing was performed by holding the assembly for an hour at the maximum temperature shown in TABLE 4.

Figure 2:
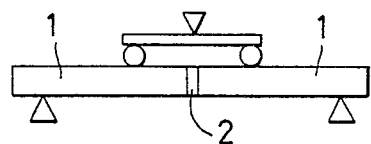
FIG. 2 is a schematic view showing a method of testing the strength of a joint between a pair of ceramic matrix segments of honeycomb construction by bending the joined assembly with a four-point bending method.

Each assembly of honeycomb construction obtained as hereinabove described was visually inspected for appearance. Its strength was tested by a four-point bending method; two spaced-apart points on each side of the joint 2 as shown in FIG. 2. Each binder was also examined for its coefficient of thermal expansion. For this examination, a 5 mm square and 50 mm long testpiece was prepared from each binder, and fire at the firing temperature employed for joining the segments of the honeycomb construction.

The results of evaluation of the joints and the thermal expansion coefficient of each binding material are shown in TABLE 4. Characters appearing in TABLE 4 to indicate the quality of each joint have the following meanings:

A: Good appearance and high bonding strength (broken first at the segments);
B: Good appearance and low bonding strength (broken first at the joint);
C: Bad appearance and high bonding strength (broken first at the segments);
D: Bad appearance and low bonding strength (broken first at the joint);

As is obvious from TABLE 2 to 4, all of the binding materials Nos. 1 to 11 according to this invention showed a high bonding strength, and gave a good appearance at the joint 2 between the segments 1. Comparative materials Nos. 12 to 16 failed to satisfy the limitations of this invention in the quantity of cordierite, crystalline glass, SiC or ZnO powder. None of them could be used to form a satisfactorily bonded assembly of the honeycomb segments.

The materials of this invention (Nos. 1 to 11) did not show any appreciable change in dimensions, coefficient of thermal expansion or mineral composition when they had been aged at a temperature of 1000° C. for 500 hours. They were by far superior to the material consisting solely of LAS, and substantially equal to cordierite, in their chemical stability against acid and sodium.

TABLE 2

| | Composition of the material (parts) | | | |
|---|---|---|---|---|
| No. | Cordierite powder (A) | Crystalline glass powder of solid solution of β-spodumene (A) | SiC powder | ZnO powder |
| Invention | | | | |
| 1 | 90 | 10 | — | — |
| 2 | 80 | 20 | — | — |
| 3 | 70 | 30 | — | — |
| 4 | 70 | 30 | 2 | — |
| 5 | 70 | 30 | 5 | — |
| 6 | 70 | 30 | — | 3 |
| 7 | 70 | 30 | 1 | 1 |
| 8 | 70 | 30 | 5 | 3 |
| 9 | 60 | 40 | 2 | 1 |
| 10 | 50 | 50 | 2 | — |
| 11 | 40 | 60 | — | — |
| Comparative | | | | |
| 12 | 95 | 5 | — | — |
| 13 | 70 | 30 | 6 | — |
| 14 | 70 | 30 | — | 4 |
| 15 | 60 | 40 | 6 | 4 |
| 16 | 35 | 65 | — | — |

TABLE 3

| | Chemical composition* (%) | | | | | |
|---|---|---|---|---|---|---|
| No. | $SiO_2$ | $Al_2O_3$ | $TiO_2$ | MgO | $Li_2O$ | $ZrO_2$ |
| Invention | | | | | | |
| 1 | 51.5 | 33.7 | 0.7 | 12.2 | 0.5 | 0.3 |
| 2 | 53.0 | 32.4 | 0.8 | 10.9 | 0.9 | 0.5 |
| 3 | 54.5 | 31.1 | 1.0 | 9.6 | 1.4 | 0.8 |
| 4 | 54.5 | 31.1 | 1.0 | 9.6 | 1.4 | 0.8 |
| 5 | 54.4 | 31.1 | 1.0 | 9.6 | 1.4 | 0.8 |
| 6 | 54.5 | 31.1 | 1.0 | 9.6 | 1.4 | 0.8 |
| 7 | 54.5 | 31.1 | 1.0 | 9.6 | 1.4 | 0.8 |
| 8 | 54.5 | 31.1 | 1.0 | 9.6 | 1.4 | 0.8 |
| 9 | 56.0 | 29.8 | 1.1 | 8.3 | 1.8 | 1.0 |
| 10 | 57.5 | 28.5 | 1.3 | 7.0 | 2.3 | 1.3 |
| 11 | 59.0 | 27.2 | 1.4 | 5.7 | 2.7 | 1.5 |
| Comparative | | | | | | |
| 12 | 50.8 | 34.4 | 0.6 | 12.9 | 0.2 | 0.1 |
| 13 | 54.5 | 31.1 | 1.0 | 9.6 | 1.4 | 0.8 |
| 14 | 54.5 | 31.1 | 1.0 | 9.6 | 1.4 | 0.8 |
| 15 | 56.0 | 29.8 | 1.1 | 8.3 | 1.8 | 1.0 |
| 16 | 59.8 | 26.6 | 1.5 | 5.1 | 2.9 | 1.6 |

*Contents of SiC and ZnO are not indicated.

TABLE 4

| No. | Firing temp. (°C.) | Coefficient of thermal expansion ($\times 10^{-6}$/°C.) | Result of joint in a cordierite honeycomb structure |
|---|---|---|---|
| Invention | | | |
| 1 | 1440 | 1.6 | A |
| 2 | 1420 | 1.4 | A |
| 3 | 1420 | 1.4 | A |
| 4 | 1410 | 1.3 | A |
| 5 | 1400 | 1.4 | A |
| 6 | 1400 | 1.3 | A |
| 7 | 1400 | 1.3 | A |
| 8 | 1390 | 1.3 | A |
| 9 | 1390 | 1.2 | A |
| 10 | 1370 | 1.2 | A |
| 11 | 1350 | 1.1 | A |
| Comparative | | | |
| 12 | 1440 | 1.8 | B |
| 13 | 1400 | 1.7 | C |
| 14 | 1400 | 1.5 | C |
| 15 | 1380 | 1.6 | D |
| 16 | 1350 | 1.1 | D |

EXAMPLE 2

A variety of binding materials (binders) for joining the segments of a cordierite honeycomb structure were prepared by mixing cordierite powders (A) and (B) shown in TABLE 1, crystalline glass powder of different composition containing a solid solution of $\beta$-spodumene and having a particle size of $-44$ $\mu$m and a commercially available SiC powder having a particle size of $-44$ $\mu$m and adding methyl cellulose and water to each mixture to form a paste thereof. The proportions of the materials are shown in TABLE 5, and the chemical composition of each mixture in TABLE 6.

Each binder was used to join 70 mm square, 50 mm high cordierite segments having thermal expansion of 0.057% at 800° C., as in EXAMPLE 1. The evaluation of each joint and the measurement of the thermal expansion coefficient of each binder were carried out as in EXAMPLE 1. The results are shown in TABLE 7. Alphabetic letters appearing in TABLE 7 to indicate the quality of each joint have the same meanings as those appearing in TABLE 4.

As is obvious from TABLE 5 to 7, all of the binders Nos. 21 to 29 according to this invention showed a high bonding strength. On the other hand, all of comparative binder materials Nos. 30 and 31, which did not satisfy the limitations of this invention in the proportions of the raw materials, and comparative binder materials Nos. 32 to 34, which did not satisfy the limitations of this invention in chemical composition, failed to form a satisfactorily bonded assembly.

TABLE 5

| No. | Composition of the material (parts) | | | |
|---|---|---|---|---|
| | Cordierite powder (A) | Cordierite powder (B) | Crystalline glass powder of $\beta$-spondumene | SiC powder |
| Invention | | | | |
| 21 | 85 | — | 15 | 2 |
| 22 | 70 | — | 30 | 2 |
| 23 | 45 | — | 55 | 2 |
| 24 | — | 70 | 30 | 2 |
| 25 | — | 70 | 30 | 2 |
| 26 | — | 70 | 30 | 2 |
| 27 | 90 | — | 10 | 2 |
| 28 | 40 | — | 60 | 2 |
| 29 | 50 | — | 50 | 2 |
| Comparative | | | | |
| 30 | 92 | — | 8 | 2 |
| 31 | 35 | — | 65 | 2 |
| 32 | 40 | — | 60 | 2 |
| 33 | — | 70 | 30 | 2 |
| 34 | 70 | — | 30 | 2 |

TABLE 6

| No. | Chemical composition* (%) | | | | | |
|---|---|---|---|---|---|---|
| | $SiO_2$ | $Al_2O_3$ | $TiO_2$ | MgO | $Li_2O$ | $ZrO_2$ |
| Invention | | | | | | |
| 21 | 51.5 | 33.7 | 1.0 | 11.8 | 0.6 | 0.0 |
| 22 | 55.7 | 30.1 | 1.9 | 9.7 | 1.2 | 0.0 |
| 23 | 64.4 | 24.8 | 0.8 | 6.2 | 2.2 | 0.0 |
| 24 | 56.8 | 29.9 | 0.0 | 10.1 | 1.4 | 0.6 |
| 25 | 55.6 | 29.0 | 3.0 | 9.8 | 1.2 | 0.0 |
| 26 | 53.8 | 28.7 | 5.1 | 9.8 | 1.2 | 0.0 |
| 27 | 51.9 | 33.3 | 0.9 | 12.4 | 0.4 | 0.0 |
| 28 | 61.4 | 25.1 | 2.9 | 5.5 | 2.7 | 0.0 |
| 29 | 57.5 | 28.5 | 0.5 | 7.0 | 2.3 | 1.8 |
| Comparative | | | | | | |
| 30 | 51.9 | 33.6 | 0.6 | 12.4 | 0.4 | 0.0 |
| 31 | 59.8 | 25.3 | 1.5 | 6.4 | 2.7 | 1.3 |
| 32 | 59.0 | 27.2 | 1.4 | 5.7 | 3.0 | 1.2 |
| 33 | 53.8 | 28.7 | 5.6 | 9.8 | 1.2 | 0.0 |
| 34 | 54.5 | 29.9 | 0.5 | 9.8 | 1.2 | 2.1 |

*The SiC content is not indicated.

TABLE 7

| No. | Firing temp. (°C.) | Coefficient of thermal expantion ($\times 10^{-6}$/°C.) | Result of joint in a cordierite honeycomb structure |
|---|---|---|---|
| Invention | | | |
| 21 | 1430 | 1.8 | A |
| 22 | 1410 | 1.1 | A |
| 23 | 1360 | 0.8 | A |
| 24 | 1410 | 1.1 | A |
| 25 | 1405 | 1.2 | A |
| 26 | 1400 | 1.3 | A |
| 27 | 1440 | 1.8 | A |
| 28 | 1350 | 0.9 | A |
| 29 | 1370 | 1.4 | A |
| Comparative | | | |
| 30 | 1440 | 2.0 | B |
| 31 | 1350 | 1.0 | D |
| 32 | 1350 | 1.0 | D |
| 33 | 1400 | 1.5 | C |
| 34 | 1410 | 1.8 | B |

EXAMPLE 3

A plurality of 130 mm $\times$ 180 mm $\times$ 80 mm (high) size segments for the matrix of a honeycomb structure having a partition thickness of 0.12 mm and a triangular cell section were molded from the cordierite material of EXAMPLE 1 by the method employed in EXAMPLE 1 for making the cordierite segments of a honeycomb structure. The cordierite material of EXAMPLE 1 was also used for the press forming of a hub having a relatively large thickness. Thirteen matrix segments and a hub were fired at a maximum temperature of 1400° C. for six hours and machined into sectoral segments forming a monolithic rotary regenerator type heat exchanger.

Methyl cellulose and water were added to material No. 9 according to EXAMPLE 1 of this invention to form a binder in the form of a paste. The binder was applied to the sectoral matrix segments and hub to joining them together to form a unitary bonded assembly. The paste was also applied to the outer periphery of the bonded matrix segments to form a coating having a thickness of about 3 mm thereon. The assembly was, then, dried and fired at a maximum temperature of 1390° C. for an hour to produce as rotary regenerator type heat exchanger formed from cordierite, provided with a hub at its center and having a diameter of 450 mm and a thickness of about 80 mm.

For comparative purposes, a heat exchanger of the same shape was formed of the same cordierite material by the same method, but employing the same cordierite material for bonding the matrix segments and coating the outerperiphery thereof.

Figure 3:
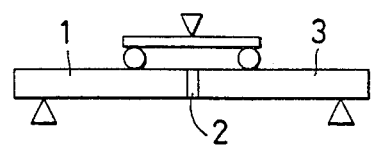
FIG. 3 is a view similar to FIG. 2, but showing a method of testing the strength of a joint between a ceramic matrix segment of honeycomb construction and a hub.

The two heat exchanger made as hereinabove set forth were examined for properties. The results are shown in TABLE 8. As is obvious from TABLE 8, the heat exchanger made by using the material of this invention as a binder and a coating material showed a highly reliable bond between every two adjoining matrix segments and between each matrix segment and the hub. Samples were cut so as to include the joint between two matrix segments and a joint between a matrix segment and the hub, and tested for strength by a four-point bending method, as shown in FIGS. 2 and 3. The joints 2 were not broken, but only the matrix segments of lower strength were broken as a result of those tests. In FIGS. 2 and 3, the matrix segments are shown at 1, and the hub at 3.

The heat exchangers were placed in an electric furnace having a temperature of 700° C. and taken out therefrom after a certain period of time, and thereby tested for thermal stress resistance. No crack was found in any of the joints in the heat exchanger made by employing the material of this invention. They were also examined for leakage at the pressure of 1.4 kg/cm$^2$. The heat exchanger made by employing the material of this invention was superior to the comparative product in gas tightness. The leak tests were conducted in accordance with the method described in page 213 of DOE/NASA/0008-12, NASA, CR-165139 "Ceramic Regenerator Systems Development Program-Final Report".

EXAMPLE 4

The cordierite matrix segments having a 130 mm by 180 mm by 80 mm (high) size, a partition thickness of 0.12 mm and a triangular cell section were immersed in a slurry containing material No. 22 according to EXAMPLE 2 and 60% of water, and after any excess of the slurry had been removed from the segments, they were dried. These procedures were repeated until the segments came to carry about 15% of the material No. 22 on the average.

The outer peripheral and end surfaces of 35 such matrix segments were machined into shapes defining a monolithic rotary regenerator type heat exchanger. An organic binder and water were added to material No. 4 according to EXAMPLE 1 to prepare a binder in the form of a paste. The binder was applied to the end surfaces of the segments to form a layer having a thickness of about 2 mm and the segments were bonded together. The binder was also applied to the outer periphery of the bonded assembly to form a coating having thickness of about 3 mm thereon. The assembly was, then, fully dried and fired at a maximum temperature of 1410° C. for an hour to provide a rotary regenerator type heat exchanger formed of cordierite and having a diameter of 700 mm and thickness of 80 mm.

For comparative purposes, a rotary regenerator type heat exchanger was formed of cordierite by employing the binder and outer peripheral coating prepared from material No. 4, but without impregnating the matrix segments with material No. 22 of EXAMPLE 2. For the sake of further comparison, a heat exchanger of the same shape was made by employing as a binder and as an outer peripheral coating material the same cordierite material as that used to form the matrix segments.

The three heat exchangers made as hereinbove set forth were examined for properties. The results are shown in TABLE 9. As is obvious from TABLE 9, the heat exchanger having the matrix impregnated with the material of this invention was superior to the other heat exchangers in various aspects. It showed an improved reduction in leakage, maintained a high thermal stress resistance without having any appreciable increase in the thermal expansion coefficient of its matrix and was

TABLE 8

|  |  | Invention | Comparative |
|---|---|---|---|
| Ceramic binding material |  | No. 9 (Example 1) | Of the same cordierite composition as the matrix |
| Outer peripheral coating material |  | No. 9 (Example 1) | Of the same cordierite composition as the matrix |
| Firing temp. for binding and coating |  | 1390° C. × 1 Hr | 1400 × 6 Hr |
| Results of four-point bending strength test | Joint between matrixes | Broken at matrixes | Broken at joint |
|  | Joint between matrix and hub | Broken at matrixes | Broken at joint |
| Thermal stress resistance (sample discharged from an electric furnace at 700° C. and checked for cracking) |  | No crack | Crack in joint |
| Leakage at a pressure of 1.4 kg/cm$^2$ (kg/sec · m$^2$) |  | 0.021 | 0.029 | highly reliable in the joints.

TABLE 9

|  | Invention |  | Comparative |
|---|---|---|---|
| Ceramic binding material | No. 4 (Example 1) | No. 4 (Example 1) | Of the same cordierite |

TABLE 9-continued

|  | Invention | | Comparative |
| --- | --- | --- | --- |
| Outer peripheral coating material | No. 4 (Example 1) | No. 4 (Example 1) | Of the same cordierite composition as the matrix |
| Matrix support | No. 22 (Example 2) | None | None |
| Firing temp. for binding, 1410° C. × 1 Hr coating and matrix pore sealing | 1410° C. × 6 Hr | 1410° C. × 6 Hr |  |
| Coefficient of thermal expansion of matrix | $0.8 \times 10^{-6}$/°C. | $0.7 \times 10^{-6}$/°C. | $0.7 \times 10^{-6}$/°C. |
| Thermal stress resistance (sample discharged from an electric furnace at 650° C. and checked for cracking) | No crack | No crack | Crack at joint |
| Leakage at a pressure of 1.4 kg/cm (kg/sec · m²) | 0.015 | 0.020 | 0.028 |

What is claimed is:

1. A ceramic material for joining, coating or sealing a honeycomb structure, comprising, per 100 parts by weight, a first mixture of 40 to 90 parts by weight of cordierite powder and 10 to 60 parts by weight of crystalline glass powder having a crystalline phase consisting essentially of a solid solution of $\beta$-spodumene, said first mixture having a chemical composition consisting essentially of 51.5 to 64.4% by weight of $SiO_2$, 24.8 to 33.7% by weight of $Al_2O_3$, 5.5 to 12.4% by weight of MgO and 0.4 to 2.7% by weight of $Li_2O$, said first mixture being fired to result in a fired body, said fired body having crystalline phases comprising at least 90 weight percent of a crystalline phase of said cordierite and said solid solution of $\beta$-spodumene and not more than 10 weight percent total of crystalline phases of mullite and a solid solution of phases selected from the group consisting of $\beta$-quartz, protoenstatite and mixtures thereof, said fired body having a coefficient of thermal expansion of not greater than $1.8 \times 10^{-6}$/°C. at a temperature of 40°–800° C.

2. A ceramic material as set forth in claim 1, wherein said first mixture is modified by adding thereto up to 5 parts by weight of SiC powder per 100 parts by weight of said modified first mixture.

3. A ceramic material as set forth in claim 1, wherein said first mixture is modified by adding thereto up to 3 parts by weight of ZnO powder per 100 parts by weight of said modified first mixture.

4. A ceramic material as set forth in claim 1, wherein said first mixture is modified by adding thereto up to 5 parts by weight of SiC powder and up to 3 parts by weight of ZnO powder per 100 parts by weight of said modified first mixture.

5. A ceramic material as set forth in claim 1, wherein said cordierite powder contains at least 90% by weight of cordierite crystals.

6. A ceramic material for joining, coating or sealing a honeycomb structure, comprising, per 100 parts by weight, a mixture of 40 to 90 parts by weight of cordierite powder and 10 to 60 parts by weight of crystalline glass powder having a crystalline phase consisting essentially of a solid solution of $\beta$-spodumene, said mixture having a chemical composition consisting essentially of 51.5 to 64.4% by weight of $SiO_2$, 24.8 to 33.7% by weight of $Al_2O_3$, 5.5 to 12.4% by weight of MgO and 0.4 to 2.7% by weight of $Li_2O$, 0–5.1% by weight of $TiO_2$ and 0–1.8% by weight of $ZrO_2$, said mixture being fired to result in a fired body, said fired body having crystalline phases comprising at least 90 weight percent of a crystalline phase of said cordierite and said solid solution of $\beta$-spodumene and not more than 10 weight percent total of crystalline phases of mullite and a solid solution of phases selected from the group consisting of $\beta$-quartz, protoenstatite and mixtures thereof, said fired body having a coefficient of thermal expansion of not greater than $1.8 \times 10^{-6}$/°C. at a temperature of 40°–800° C.

7. A ceramic material as set forth in claim 6, wherein said cordierite powder contains at least 90% by weight of cordierite crystals.

* * * * *